United States Patent
Nosse et al.

(10) Patent No.: US 6,860,061 B2
(45) Date of Patent: Mar. 1, 2005

(54) APPARATUS FOR ATTRACTING MOSQUITOES AND NOT ATTRACTING BENEFICIAL INSECTS TO ELECTRONIC BUG KILLERS

(75) Inventors: John G. Nosse, Grafton, OH (US); Terrill G. Kocsis, Ridgeville, OH (US)

(73) Assignee: University of Delaware, Newark, DE (US)

( * ) Notice: Subject to any disclaimer, the term of this patent is extended or adjusted under 35 U.S.C. 154(b) by 0 days.

(21) Appl. No.: 10/387,406

(22) Filed: Mar. 17, 2003

(65) Prior Publication Data

US 2003/0172581 A1 Sep. 18, 2003

Related U.S. Application Data

(60) Provisional application No. 60/365,876, filed on Mar. 18, 2002.

(51) Int. Cl.[7] .............................. A01M 1/04; H05B 1/00
(52) U.S. Cl. ............................ 43/113; 43/112; 219/201
(58) Field of Search .................... 43/113, 112; 219/201

(56) References Cited

U.S. PATENT DOCUMENTS

| | | | | |
|---|---|---|---|---|
| 793,229 A | * | 6/1905 | Rolfe | 219/242 |
| 1,050,967 A | * | 1/1913 | McComb | 362/255 |
| 2,124,543 A | * | 7/1938 | Clyne | 392/393 |
| 2,182,904 A | * | 12/1939 | Roever | 313/11 |
| 3,540,145 A | * | 11/1970 | McEwen | 43/113 |
| 4,248,459 A | * | 2/1981 | Pate et al. | 285/319 |
| 4,523,404 A | * | 6/1985 | DeYoreo | 43/112 |
| 4,883,942 A | * | 11/1989 | Robak et al. | 219/227 |
| 5,083,251 A | * | 1/1992 | Parker | 362/255 |
| 5,967,194 A | * | 10/1999 | Martin | 138/156 |
| 6,108,965 A | * | 8/2000 | Burrows et al. | 43/113 |
| 6,193,894 B1 | * | 2/2001 | Hollander | 210/748 |

* cited by examiner

Primary Examiner—Teri P. Luu
Assistant Examiner—Bret Hayes
(74) Attorney, Agent, or Firm—Connolly, Bove, Lodge & Hutz LLP

(57) ABSTRACT

An apparatus for attracting mosquitoes to an electronic insect killing machine (i.e., bug zapper) is provided. The apparatus includes a converter device that fits over a fluorescent or ultraviolet light bulb of the bug zapper. The converter device controls radiant light and heat emitted by the light bulb to produce a desired level of heat to create a warm mass, or host simulator that simulates a blood host meal for biting insects. Mosquitoes and other biting insects, which have infrared vision, are attracted to the host simulator. When used with a scented lure that lures the mosquitoes and biting insects near the insect killer, the host simulator lures the mosquitoes and other insects to the killing device of the insect killer. The mosquitoes and biting insects are destroyed once lured to the killing device. The converter device also blocks most of the visible light emitted by the light bulb, and therefore does not lure beneficial insects, which are attracted to visible light, into the insect killer.

6 Claims, 5 Drawing Sheets

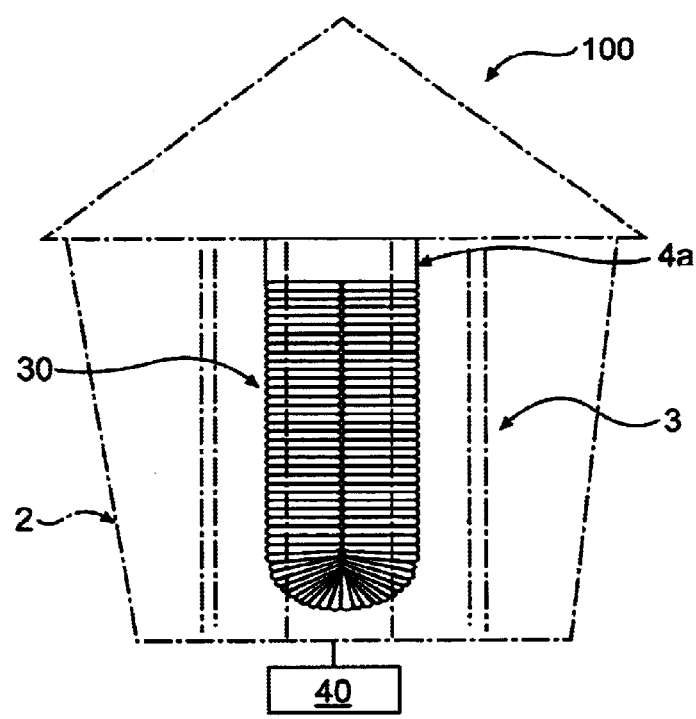
FIG. 7
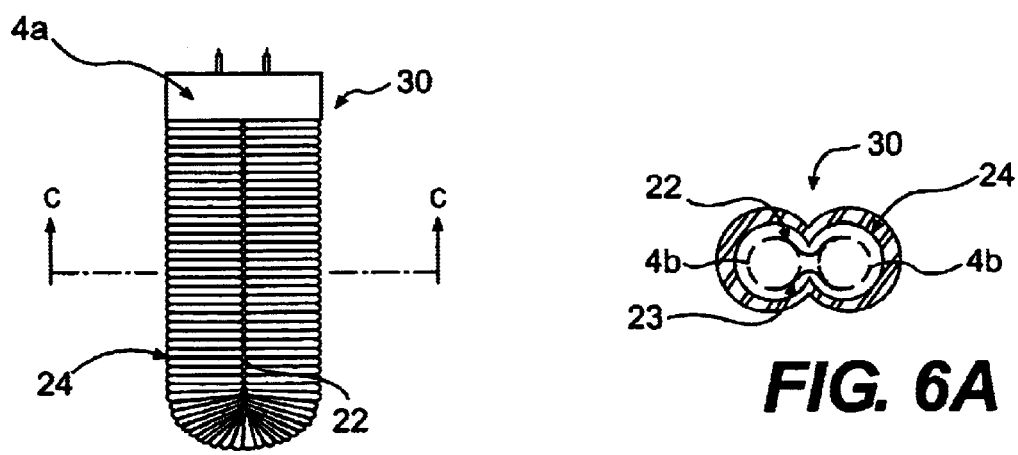
FIG. 6
FIG. 6A

APPARATUS FOR ATTRACTING MOSQUITOES AND NOT ATTRACTING BENEFICIAL INSECTS TO ELECTRONIC BUG KILLERS

RELATED APPLICATIONS

This application claims priority from U.S. Provisional Patent Application Ser. No. 60/365,876, filed Mar. 18, 2002, and entitled "Apparatus for the attraction of mosquitoes and not attracting beneficial insects to electronic bug killers".

The invention relates to improvements in the control of biting insects and the reduction in deaths of beneficial insects by overcoming shortcomings in the use of commercially popular electronic insect killers (bug zappers). The invention particularly relates to controlling mosquitoes in an urban environment.

BACKGROUND OF THE INVENTION

Devices for attracting and destroying insects are well known in the art. For example, U.S. Pat. No. 4,908,979 to Hostetter discloses a device that uses a sex attractant, a third generation pesticide, and a black light attached to streetlights to primarily to attract Gypsy Moths. U.S. Pat. No. 4,519,776 to DeYoreo et. al., U.S. Pat. No. 4,907,366 to Balfour, U.S. Pat. Nos. 5,657,576 and 6,088,949 to Nicosia, U.S. Pat. Nos. 5,799,436 and 6,055,766 to Nolan et al., U.S. Pat. No. 6,050,025 to Wilbanks and U.S. Pat. No. 6,305,122 to Iwao all disclose devices that use a scent attractant and a form of heat to lure mosquitoes. U.S. Pat. No. 5,255,468 to Sheshire teaches a device that uses light, heat and motion as an attractant. U.S. Pat. No. 5,280,684 discloses killing insects and specifically flies in trash cans using garbage as a scent lure. U.S. Pat. No. 5,369,909 to Murphy teaches modifying an electric fence on a farm for the control of flies. U.S. Pat. No. 4,907,366 to Balfour uses lactic acid and water heated to simulate human breath.

Although the references described above disclose devices and methods for attracting and killing insects, none of the aforementioned references fully address the shortcomings of commercial bug zappers. Commercial bug zappers generally utilize scent attractants and ultraviolet or fluorescent light to attract insects to a killing mechanism where the insects are electrocuted. One problem with these devices is that the light attracts beneficial insects, resulting in unnecessary and unwanted killing of these insects, which may include insects that feed on mosquitoes. Another problem with bug zappers is that they do not attract mosquitoes and other biting insects particularly well due to the fact that bug zappers rely on light to lure insects into the killing mechanism of the bug zapper. Mosquitoes and other biting insects generally have infrared vision and are not attracted to light.

Therefore, an affordable and effective device is needed for improving the ability of bug zappers to attract and kill mosquitoes and biting insects while reducing the likelihood of beneficial insects being killed by bug zappers.

SUMMARY OF THE INVENTION

A primary object of the present invention is to provide a device that produces more effective killing of biting insects, particularly mosquitoes, by commercial electronic insect killers. Another object of the invention is to provide a device for killing mosquitoes and biting insects while reducing the killing of beneficial insects. Another object of the invention is to achieve the aforementioned objects in a cost-effective manner.

To achieve the above objects, the invention discloses a converter device that controls radiant light and heat emitted by the light bulb of an electronic insect killer to produce a desired level of heat suitable for simulating a warm host body for mosquitoes and other biting insects. The converter device blocks the majority of the light emitted by the light bulb to prevent beneficial insects from being attracted to the killing mechanism of the insect killer. The converter device includes a heat diffusing and light shielding element that is positioned over the light bulb, and an outer cover that is placed over the light bulb and the heat diffusing and light shielding element.

The invention also provides a warm-blooded host simulator using a light bulb from a conventional insect killing machine.

A preferred embodiment of the invention may further provide an electronic insect killer including the warm-blooded host simulator described above. The simulator is installed in the insect killer such that it lures mosquitoes and other biting insects into the killing mechanism (e.g., electrical grid) of the insect killer. The insect killer further includes a scented lure to lure mosquitoes and biting insects within a few feet of the insect killer, where the mosquitoes and biting insects will then detect and become attracted to the host simulator.

BRIEF DESCRIPTION OF THE DRAWINGS

FIG. 6 is a plan view of the warm-blooded host simulator of FIG. 4 in a fully assembled state.

FIG. 6A is a view taken along section C—C of FIG. 6.

FIG. 7 shows a novel insect killing machine including the warm-blooded host simulator of FIG. 6.

DETAILED DESCRIPTION OF THE INVENTION

Figure 1:
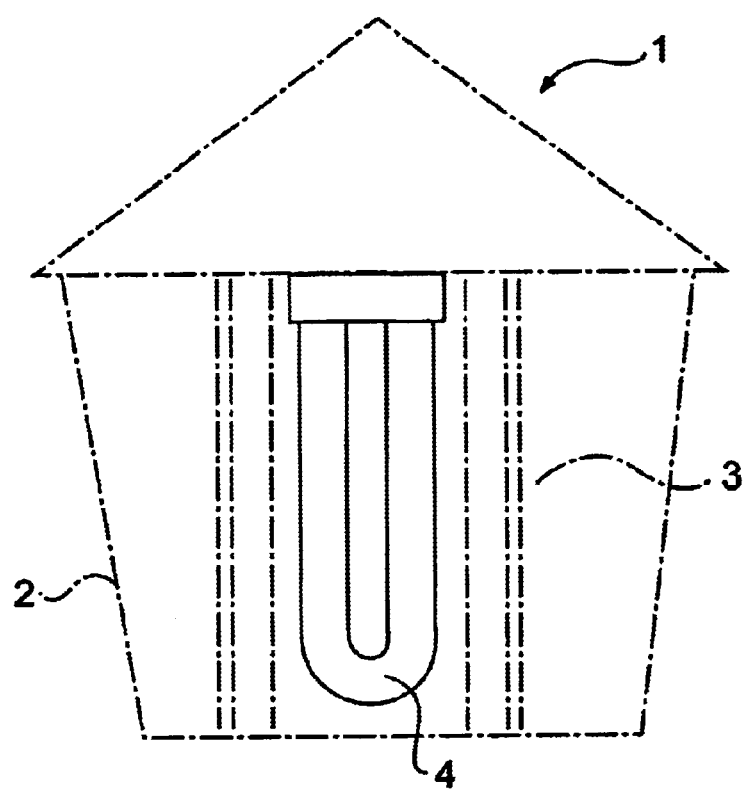
FIG. 1 shows a known insect killing machine.
Figure 2:
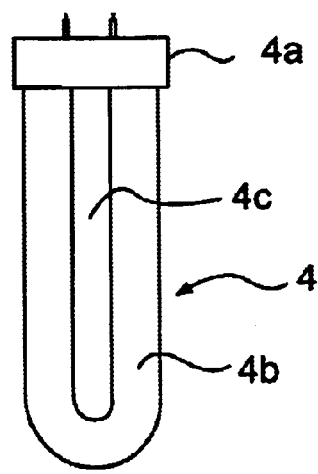
FIG. 2 shows a known light bulb for the machine of FIG. 1.

FIG. 1 shows a known commercial electronic insect killing machine, or "bug zapper" 1. The bug zapper 1 includes housing 2. A killing mechanism 3, such as an electrostatic grid, is positioned within the housing 2 for electrocuting insects. The killing mechanism 3 is connected to a source of electric potential (not shown). At least one fluorescent or ultraviolet light bulb 4 is positioned within the killing mechanism 3 for attracting insects to the killing mechanism. As best illustrated in FIG. 2, the light bulb 4 is generally U-shaped and includes an insulator end 4a and U-shaped illuminating tube 4b having spaced apart longitudinal light sections. In operation, the light bulb 4 illuminates and thereby attracts insects to the killing mechanism 3, where the insects are electrocuted. The bug zapper 1 is not optimized for killing mosquitoes and other biting insects, as the light bulb 4 tends to attract beneficial insects and not mosquitoes and biting insects, which are attracted to heat rather than light.

Figure 3:
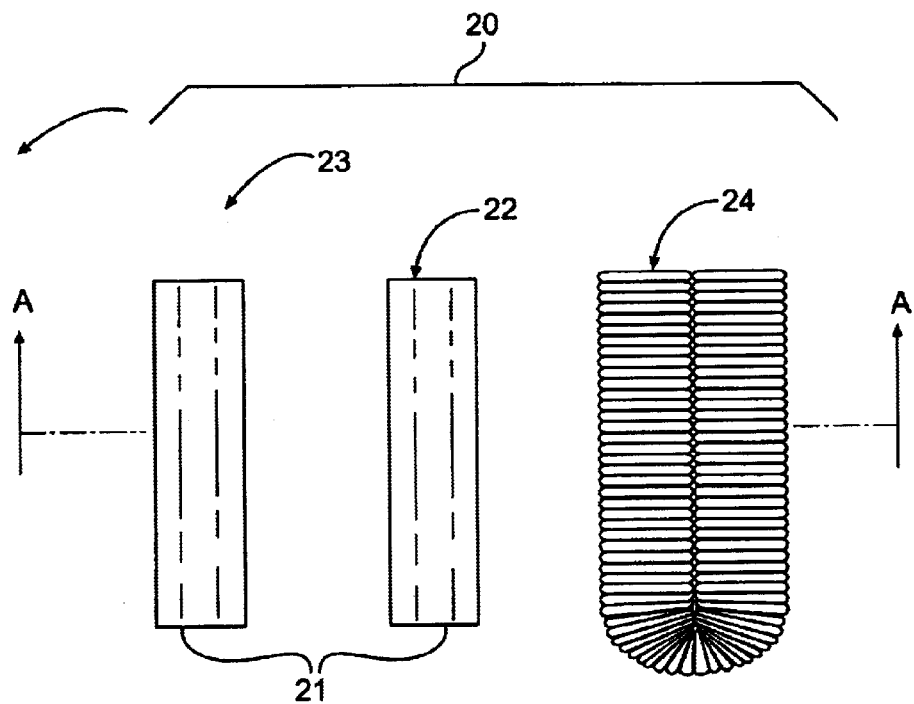
FIG. 3 is a plan view of an insect attraction device for an insect killing machine according to a preferred embodiment of the invention.
Figure 3A:
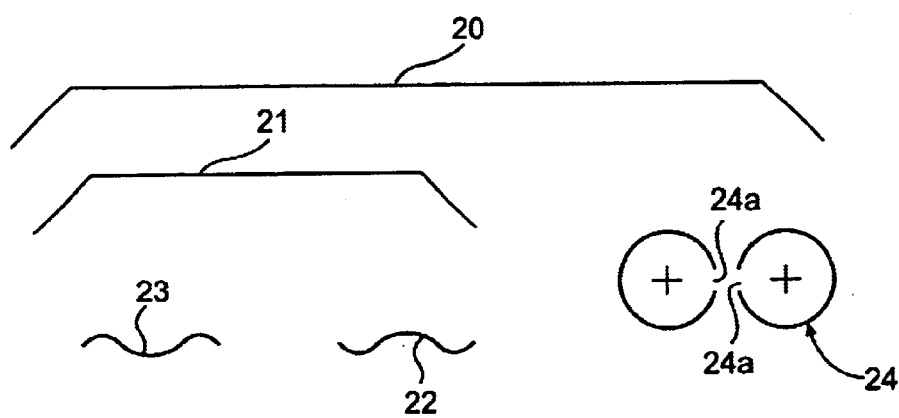
FIG. 3A is a view taken along section A—A of FIG. 3.

FIGS. 3 and 3A show a converter device 20 for converting the light and heat energy from the light bulb 4 into a desired amount of heat. The converter device includes a heat diffusing and light shielding element 21 and an outer cover 24. The heat diffusing and light shielding element 21 preferably comprises two substantially identical rectangular heating and shielding pieces 22, 23 shaped to fit over the light bulb 4. According to preferred embodiments, each piece 22, 23 includes a longitudinal U-shaped recess 22a, 23a located at a middle portion of the piece 22, 23. The heating and shielding pieces 22, 23 may be pieces of aluminum flashing or other elements made from aluminum, copper, metal or high temperature plastic, for example. The outer cover 24 is preferably a corrugated wire loom that is made of high temperature nylon, although other suitable covering elements and materials may be used. For example, the cover 24 may be constructed from aluminum, copper, metal or high temperature plastic that is molded or otherwise shaped to fit over the light bulb 4. According to the preferred embodiment shown in FIGS. 3 and 3A, the outer cover 24 includes a longitudinal slit 24a, extending along the entire length of the outer cover 24, that communicates with the hollow interior 24b of the outer cover 24 and allows the outer cover 24 to be fitted over the illuminating tube 4b of the light bulb 4.

When the converter device 20 is installed on the light bulb 4, an insect attraction device, or warm-blooded host simulator is formed. Such a host simulator is described in following paragraphs with reference to FIGS. 3–5.

Figure 4:
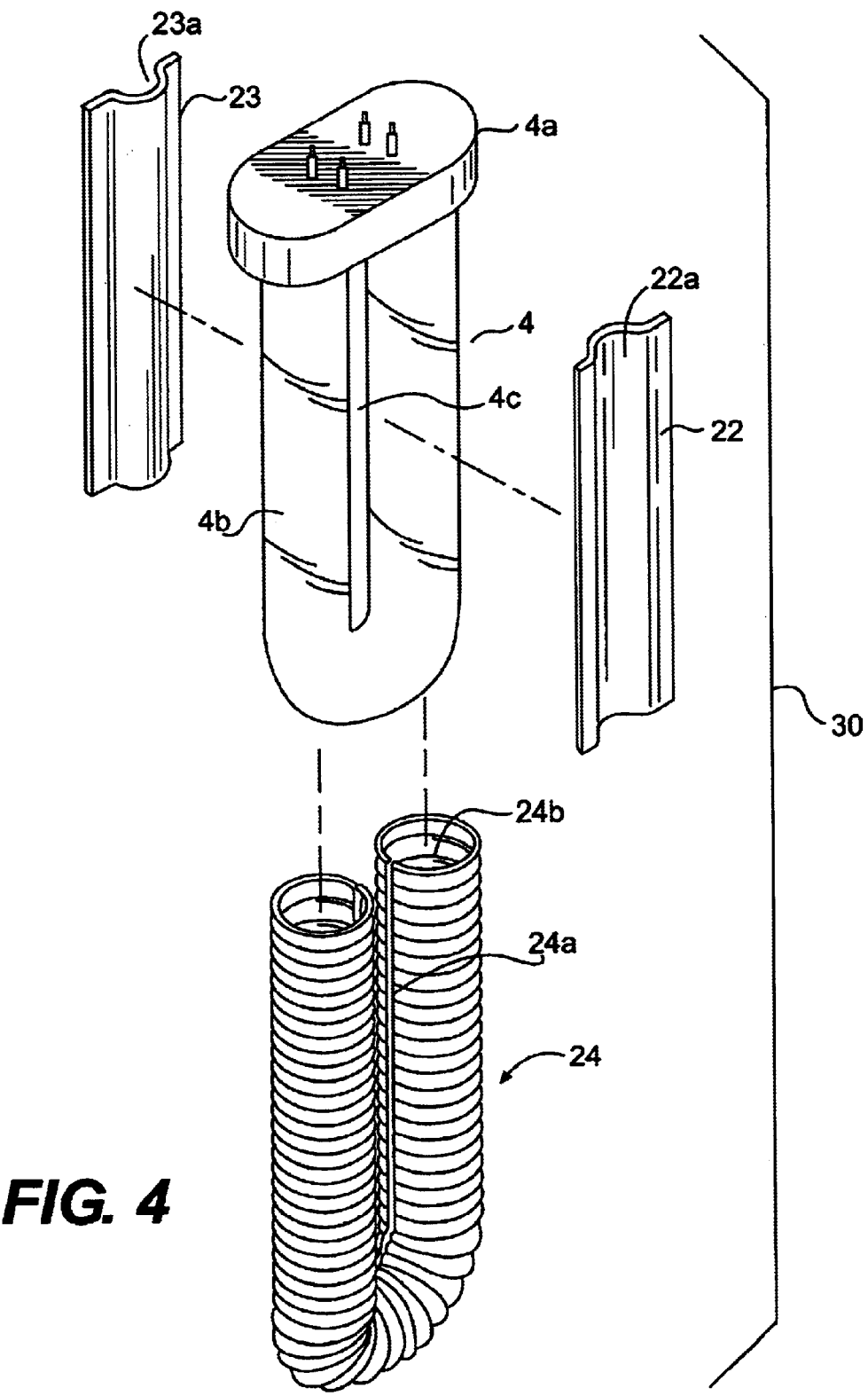
FIG. 4 is an exploded perspective view of a warm-blooded host simulator according to a preferred embodiment of the invention.

FIG. 4 shows an exploded view of a warm-blooded host simulator 30. As shown in FIG. 4, the host simulator 30 includes the converter device 20 and the light bulb 4.

Figure 5:
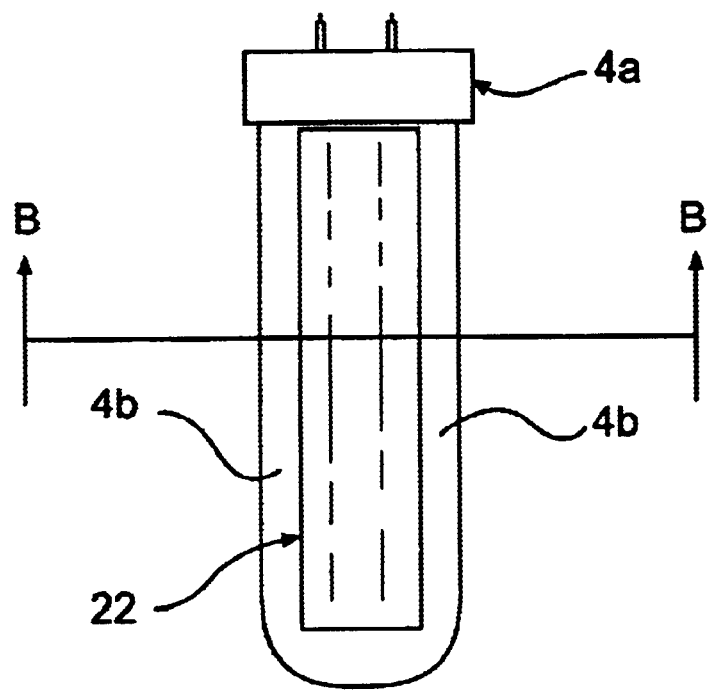
FIG. 5 shows some of the components of the warm-blooded host simulator of FIG. 4 in a partially assembled state.
Figure 5A:
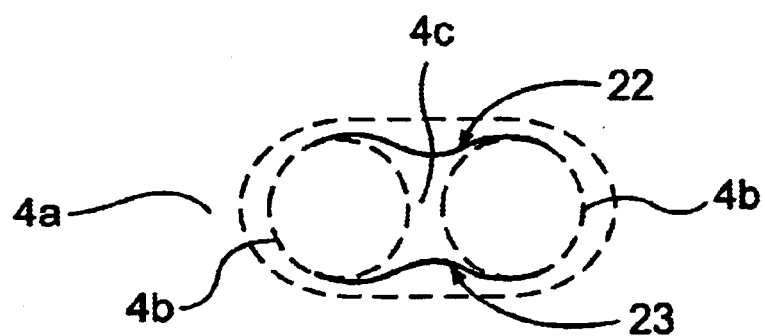
FIG. 5A is a view taken along section B—B of FIG. 5.

FIGS. 5 and 5A show components of the host simulator 30 after a first step of assembly in which the heat diffusing and light shielding element 21 is positioned on the light bulb 4. When the heat diffusing and light shielding element 21 is installed, the heating and shielding pieces 22 and 23 are positioned on the tube 4b of the light bulb 4 such that the heating and shielding pieces 22, 23 contact portions of the light bulb 4 and cover the majority of the illuminating tube 4b. The pieces 22, 23 face each other through a space 4c separating the spaced apart longitudinal sections of the illuminating tube 4b. The U-shaped recesses 22a, 23a provide pathways for heat to vent out of the simulator 30 above the insulation end 4a of the light bulb 4.

FIGS. 6 and 6A show the host simulator 30 in a fully assembled state. Referring to these figures, the outer cover 24 covers the heat diffusing and light shielding element 20, and those portions of the light bulb tube 4b that are not covered by the heat diffusing and light shielding element 20. The outer cover 24 is installed by opening the slit 24a and inserting the tube 4a and heating and shielding pieces 22, 23 into the interior 24b of the outer cover 24. Thus, the outer cover 24 nearly entirely covers the tube 4a.

FIG. 7 shows an improved bug zapper 100. In FIG. 7, reference numbers shared with FIGS. 1 and 6 indicate similar components. The bug zapper 100 includes a host simulator 30 positioned within the killing mechanism 3. A scented lure 40 is also positioned in or on the bug zapper 100. The scented lure 40 contains a chemical attractant for drawing mosquitoes and biting insects near the bug zapper 100. The lure 40 may be a packaged liquid, gas or solid, and may include any suitable chemical attractant. Examples of suitable chemical attractants include, but are not limited to, Octenol and carbon dioxide. The operation of the bug zapper 100 and host simulator 30 will now be described.

When the bug zapper 100 is operational, the light bulb 4 illuminates in the same manner as a light bulb in the conventional bug zapper 1, and the killing device 3 is electrically charged. Due to light and heat energy emitted by the light bulb 4, and the insulating and shielding effects of the converter device 20, the host simulator 30 maintains a suitable level of heat to simulate a live host for mosquitoes and biting insects. More specifically, the converter device 20 (shown in FIG. 2) blocks most of the light emitted by the light bulb 4 and thereby controls the radiant light and heat emitted by the light bulb 4 to produce a desired level of heat. The converter device 20 is preferably designed such that a temperature of between 95° F. and 110° F. is maintained over most of the outer surface of the outer cover 24. It is within this temperature range that the simulator 30 "looks" most like a host meal to mosquitoes and biting insects. The heat diffusing and light shielding element 21 blocks a significant amount of the light emitted by the light bulb 4. Additionally, the heat diffusing and light shielding element 21 radiates heat substantially evenly through the converter device 20 and vents some heat out past the top of the insulator end 4a of the light bulb 4.

The outer cover 24 assists in blocking light emitted by the light bulb 4 and receives heat energy transferred from the light bulb 4 and heat diffusing and light shielding element 21. Air gaps (not shown) exist between the element 21 and the outer cover 24, as well as between the element 21 and the light bulb 4. These are gaps serve as insulation to help maintain the appropriate amount of heat in the host simulator 30.

The surface temperature of the cover 24 is affected, for example, by the size, dimensions and materials of the components of the converter device 20, as well as by the power rating of the light bulb 4. Thus, the desired surface temperature can be achieved by changing the size, dimensions and/or materials of the various components and/or using a light bulb of a different power rating. Typically, light bulbs 4 for bug zappers are available in 7 watt, 15 watt, 20 watt and 40 watt versions. The embodiments disclosed herein have been implemented and tested with light bulbs 4 of 15 watt, 20 watt and 40 watt varieties. Exemplary specifications for a host simulator 30 including light bulbs 4 of the various types listed above are provided in Table 1 below. Although Table 1 presents specific examples of the invention, the invention is not limited to the examples provided in the table.

TABLE I

| Light Bulb 4 (wattage) | Outer Cover 24 (material; inner diameter; length) | Heat Diffusing and Light Shielding Element 21 (material; width; length; thickness) |
| --- | --- | --- |
| 15 Watts | Nylon wire loom; 0.75 in.; 13.00 in. | Aluminum; 1.50 in.; 6.00 in.; 29 gage |
| 20 Watts | Nylon wire loom; 1.00 in.; 13.75 in. | Aluminum; 2.25 in.; 5.75 in.; 29 gage |
| 40 Watts | Nylon wire loom; 1.00 in.; 23.00 in. | Aluminum; 2.25 in.; 10.00 in.; 29 gage |

Mosquitoes and biting insects are lured near the bug zapper 100 by the scented lure 40. Once near the bug zapper 100, the mosquitoes and biting insects are attracted to the host simulator 30. The mosquitoes and biting insects are destroyed by the killing mechanism 3 as they attempt to investigate the host simulator 30. Additionally, since the converter device 20 blocks most of the light emitted by the light bulb 4, beneficial insects, which are attracted to light, are less likely to be attracted to and killed by the bug zapper 100.

It should be noted that it is possible to operate the host simulator 30 without the heat diffusing and light shielding element 21. However, without the heat diffusing and light shielding element 21, the heat emitted by the light bulb 4 may generate "hot spots" (i.e., areas of the outer cover 24 that are significantly warmer than other areas of the outer cover 24). Without the heat diffusing and light shielding element 21, hot spots may particularly tend to form near the insulator end 4a of the light bulb 4. In addition, eliminating the heat diffusing and light shielding element 21 from the host simulator 30 may also result in less light being blocked by the converter device 20, which may cause unwanted attraction of beneficial insects to the host simulator 30.

Although the converter device 20 described above is constructed to fit a U-shaped light bulb, it should be understood that the converter device 20 can be modified to fit various light bulbs. More particularly, the size and/or shape of the thermal diffuser 21 and/or the outer cover 24 may be altered to accommodate different light bulbs.

The present invention provides an effective and cost-efficient solution for mosquito and biting insect control. Since the host simulator 30 is constructed from a standard bug zapper light bulb 4 modified by a converter device 20, a converter device 20 can be installed on an existing light bulb 4 in a bug zapper 1 to create the host simulator 30. Alternatively, a light bulb 4 in existing bug zapper 1 can be removed and replaced by an assembled host simulator 30. Thus, the present invention can be applied to existing bug zappers as well as new bug zappers.

While the invention has been illustrated in connection with preferred embodiments, variations within the scope of the invention will likely occur. Thus, it is understood that the invention is covered by the following claims.

We claim:

1. An insect attraction device comprising:
   a U-shaped light bulb having an illuminating tube comprising first and second spaced apart longitudinal light sections;
   a first heat diffusing and light shielding element constructed of metal or high temperature plastic;
   a second heat diffusing and light shielding element constructed of metal or high-temperature plastic, wherein said first heat diffusing and light shielding element and said second heat diffusing and light shielding element are disposed on opposite sides of said U-shaped light bulb, are shaped to contact portions of the illuminating tube, and face each other through a space separating said first and second spaced apart longitudinal light sections; and
   a cover surrounding said first and second heat diffusing and light shielding elements and substantially entirely covering the illuminating tube.

2. The insect attraction device of claim 1, wherein said cover is constructed of metal or plastic.

3. The insect attraction device of claim 1, wherein said cover is a corrugated wire loom.

4. An electronic insect killing machine comprising:
   a housing;
   a killing mechanism positioned within the housing; and
   an insect attraction device positioned within the killing mechanism,
   wherein the insect attraction device comprises:
   a U-shaped light bulb having an illuminating tube comprising first and second spaced apart longitudinal light sections;
   a first heat diffusing and light shielding element constructed of metal or high temperature plastic;
   a second heat diffusing and light shielding element constructed of metal or high-temperature plastic, wherein said first heat diffusing and light shielding element and said second heat diffusing and light shielding element are disposed on opposite sides of said U-shaped light bulb, are shaped to contact portions of the illuminating tube, and face each other through a space separating said first and second spaced apart longitudinal light sections; and
   a cover surrounding said first and second heat diffusing and light shielding elements and substantially entirely covering the illuminating tube.

5. The electronic insect killing machine of claim 4, wherein said cover is constructed of metal or plastic.

6. The electronic insect killing machine of claim 4, wherein said cover is a corrugated wire loom.

* * * * *